(12) United States Patent
O'Regan et al.

(10) Patent No.: US 10,186,850 B1
(45) Date of Patent: Jan. 22, 2019

(54) NON-METALLIC ELECTRICAL CABLE SUPPORT ARRANGEMENT

(71) Applicant: Electrical Materials Company, Genoa City, WI (US)

(72) Inventors: Timothy M. O'Regan, Chicago, IL (US); Timothy J. O'Regan, Park Ridge, IL (US)

(73) Assignee: ELECTRICAL MATERIALS COMPANY, Genoa City, WI (US)

( * ) Notice: Subject to any disclaimer, the term of this patent is extended or adjusted under 35 U.S.C. 154(b) by 0 days.

(21) Appl. No.: 15/723,058

(22) Filed: Oct. 2, 2017

(51) Int. Cl.
*H02G 9/10* (2006.01)
*H02G 3/04* (2006.01)

(52) U.S. Cl.
CPC ............ *H02G 3/0406* (2013.01); *H02G 9/10* (2013.01)

(58) Field of Classification Search
CPC ............................... H02G 3/0406; H02G 9/10
USPC .................... 174/70 R; 211/60.1, 87.01, 103
See application file for complete search history.

(56) References Cited

U.S. PATENT DOCUMENTS

| | | | | |
|---|---|---|---|---|
| 3,164,255 | A | * | 1/1965 | Jay ......................... A47B 57/52 211/193 |
| 3,233,852 | A | * | 2/1966 | Azar .................... A47B 96/027 248/243 |
| D326,999 | S | | 6/1992 | Johnson et al. |
| D336,421 | S | | 6/1993 | Grubicy et al. |
| D369,293 | S | * | 4/1996 | Gusdorf ......................... D8/381 |
| D407,963 | S | | 4/1999 | Gretz et al. |
| 6,667,442 | B1 | | 12/2003 | Hilligoss |
| 7,140,500 | B2 | | 11/2006 | McCoy |
| 7,201,282 | B1 | * | 4/2007 | Alderman .............. A47B 81/00 211/100 |
| 7,806,629 | B2 | | 10/2010 | McCoy |
| 7,942,371 | B1 | | 5/2011 | McCoy |
| 8,550,259 | B1 | | 10/2013 | McCoy |
| 8,567,734 | B2 | | 10/2013 | McCoy |
| 8,596,590 | B2 | | 12/2013 | McCoy |
| 8,733,560 | B2 | | 5/2014 | McCoy |

(Continued)

OTHER PUBLICATIONS www.com-u-tech.com, multiple webpages, retrieved Oct. 2017 (7 pages).

*Primary Examiner* — Michael F McAllister
(74) *Attorney, Agent, or Firm* — Greer Burns & Crain, Ltd.

(57) ABSTRACT

An electrical cable support system for use with large diameter, heavy electrical cables disposed in confined spaces includes as least one support structure-mounted stanchion coupled to a generally triangular support bracket adapted for receiving and supporting one or more electrical cables. The coupling between the stanchion and support bracket allows for pivoting displacement of the support bracket on the wall-mounted stanchion to accommodate movement of the cables during electrical load cycling. The support bracket includes a first upper generally horizontal linear arm adapted for receiving and supporting one or more electrical cables, a second lower, inclined arm having plural steps proceeding downward toward the stanchion to provide an increased space below the support bracket to accommodate increased numbers of electrical cables. The support bracket is tapered along its horizontal and vertical axes to better distribute cable weight over the support bracket's entire length and height, and includes an inner apertured portion comprised of crisscrossed trusses for reduced weight and increased strength.

10 Claims, 4 Drawing Sheets

(56) References Cited

U.S. PATENT DOCUMENTS

| | | |
|---|---|---|
| 8,960,612 B2 | 2/2015 | McCoy |
| 2006/0091088 A1* | 5/2006 | McCoy .................... H02G 3/30 |
| | | 211/60.1 |
| 2006/0113442 A1* | 6/2006 | Plate ........................ B64C 1/00 |
| | | 248/228.1 |
| 2014/0026393 A1 | 1/2014 | McCoy |
| 2015/0114683 A1* | 4/2015 | O'Regan .................. H01B 3/30 |
| | | 174/174 |

* cited by examiner

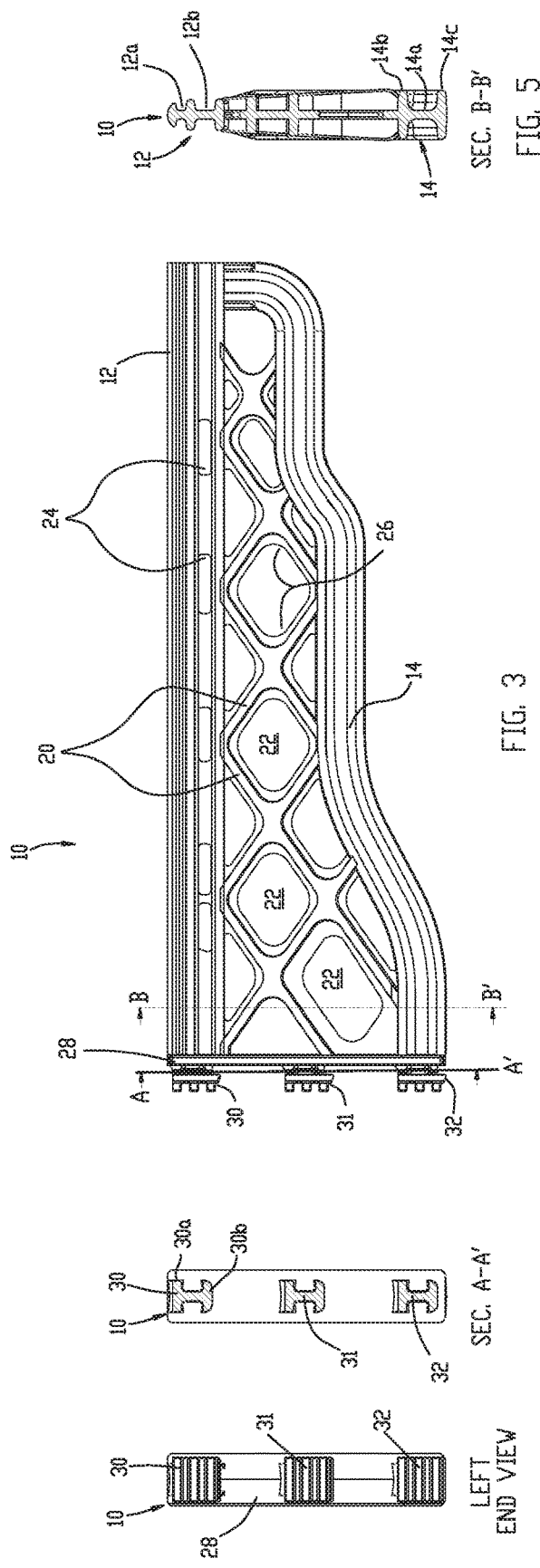

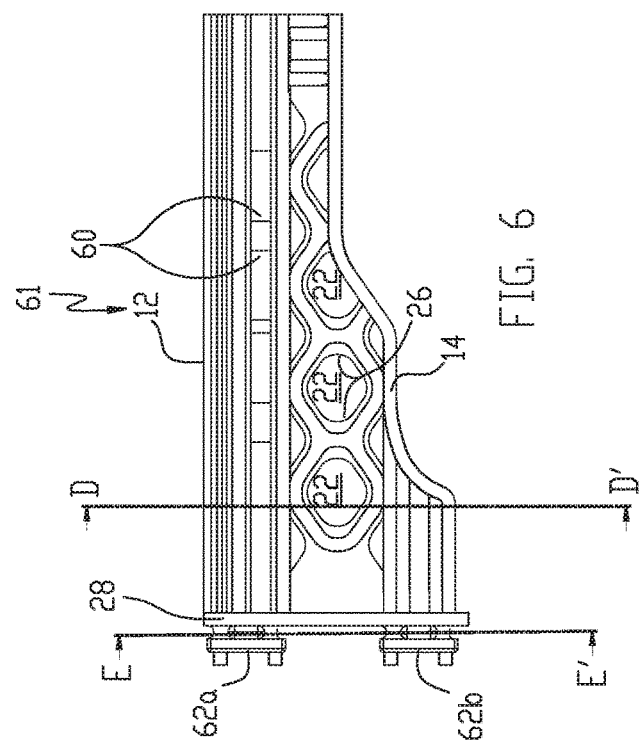

NON-METALLIC ELECTRICAL CABLE SUPPORT ARRANGEMENT

FIELD OF THE INVENTION

This invention relates generally to the positioning and support of heavy electrical utility cables, and is particularly directed to a non-metallic, high strength, compact electrical cable support bracket and support bracket mounting arrangement particularly adapted for use in enclosed spaces of limited size.

BACKGROUND OF THE INVENTION

Electric power distribution cables are commonly routed underground in manholes, vaults and tunnels. These environments are characterized by limited space and close positioning between adjacent electrical utility cable circuits. As such, the electrical cables must be securely maintained in controlled position so as to ensure proper spacing between the cables so that they do not interfere with one another, while affording workers sufficient space to carry out maintenance tasks and additional installation. While the aforementioned enclosures are generally closed and to a certain extent sealed, the environment within these enclosed spaces contains moisture and humidity. Indeed, many of these underground enclosures are subject to frequent flooding, as well as breaches by underground pests, sewage and corrosive elements.

When housed in an underground enclosure, electrical power cables should be maintained in an elevated position above the enclosure's floor for maintenance purposes. These types of cables are typically engaged and supported by cable racks capable of withstanding the range of temperatures encountered in these types of environments, as well as the moisture and humidity associated with these subterranean enclosures. The underground cable support racks are typically comprised, at least in part, of metal components which are subject to galvanic and stray current corrosion. This type of corrosion is capable of damaging or destroying metal electrical cable support structures possibly resulting in electrical power interruption. These electrically conductive metal racks also constitute a safety hazard to workers tending to the manhole, vault or tunnel.

U.S. Pat. Nos. 8,960,612 and 8,733,560 disclose cable support systems which include support members comprised of reinforced polymers and are intended for use with communication cables. These cable support systems are unable to accommodate the large expansion characteristics of current electrical utility distribution cables having a 3-1/c spiral configuration. Current electrical utility cable saddles are required to have the capability to limit cable movement to the cable's longitudinal axis along its length and prevent lateral cable movement which can cause cable joint failure.

The present invention addresses, in general, environmental conditions encountered by electric cables located underground, and is particularly directed to a nonmetallic support arrangement for securely maintaining electrical cables in a fixed, elevated position in an underground structure such as a manhole, vault or tunnel. The present invention is particularly directed to a lightweight, non-metallic, cantilevered cable support bracket adapted for secure, direct coupling to a support structure-mounted stanchion without the need for conventional couplers, such as screws or nut and bolt combinations. The present invention accommodates movement of an electrical cable(s) in manholes arising from its load cycle in directions primarily along its length, and only slightly transverse movement to the cable's longitudinal axis.

OBJECTS AND SUMMARY OF THE INVENTION

Accordingly, it is an object of the present invention to provide an electrical cable support bracket with increased strength for use with high or low voltage power cables in substations or in underground tunnels, manholes or transformer vaults.

It is another object of the present invention to provide an electrical cable support bracket which is easily attached to and removed from an elongated, generally linear stanchion without the use of a separate coupling member such as a screw or nut and bolt combination.

It is a further object of the present invention to provide a high strength, non-conductive, and non-corroding electrical cable support bracket comprised of a high strength plastic, such as 40% fiber reinforced nylon or fiber reinforced polypropylene which eliminates the need for electrical insulating or grounding.

A still further object of the present invention is to provide a compact electrical cable support bracket particularly adapted for use in small, confined spaces such as encountered in underground electrical vaults, tunnels and manholes.

Yet another object of the present invention is to reduce the length and height of a high strength electrical cable support bracket such as for use in confined spaces, which includes a stepped lower edge for reducing the vertical dimensions in proceeding away from the support structure to which the support bracket is attached.

Another object of the present invention is to provide an elongated, generally linear electrical cable support bracket with tapered, transverse cross sections which narrow in proceeding outward from its inner supporting edge and upward from its lower to its upper edge to more uniformly distribute the cable load applied to the bracket.

Another object of the present invention is to increase the strength of an electrical cable support system including an elongated, generally linear stanchion adapted for coupling to a support structure, such as a wall or column, and a generally triangular cantilevered support bracket adapted to receive and support one or more electrical cables, where the stanchion and support bracket are comprised of a high strength plastic such as fiber-reinforced nylon and are adapted for secure mutual coupling without the need for a third element such as a screw or nut and bolt combination.

A still further object of the present invention is to provide an electric cable support bracket which is light in weight for easier and quicker installation, is of high strength, and includes an inner array of crossed trusses intersecting at 35° relative to horizontal to form X-shaped truss arrays, with each intersection including plural semi-circular arches for reinforcement to accommodate buckling forces arising from the cable weight Still another object of the present invention is to provide an electrical cable support bracket having an upper edge portion engaging and supporting one or more electrical cable saddles, where the upper bracket edge portion is in the form of an elongated dome, or convex shape, for increased cable saddle support area.

Yet another object of the present invention is to provide an electrical cable support bracket adapted for coupling to and supporting one or more cable saddles in a sliding manner to accommodate cable movement during electrical load cycling.

A still further object of the present invention is to provide a non-metallic, fiber-reinforced, injection molded, cantilevered electrical cable support bracket having a multiple I-beam cross-section for providing vertical support for one or more electrical cables, while allowing for controlled cable movement when carrying an electrical load.

The present invention contemplates a unitary non-metallic, high strength cantilevered arrangement for supporting one or more electrical power cables comprising: a first upper, generally horizontal linear arm for receiving one or more electrical cables, said upper arm having first and second opposed ends and at least one I-beam section extending the length thereof and a convex top surface adapted for engaging the one or more electrical cables and providing an increased cable support area; a second lower arm having third and fourth opposed ends, wherein the second end of said first arm is formed integrally with the third end of the second arm and the second arm is inclined downwardly from its third end to its fourth end and is non-linear including plural stepped portions disposed along its length to provide increased space beneath the second arm, wherein the first upper and second lower arms each include at least one I-beam section extending the length of the arm for increased strength; plural interconnected trusses forming an apertured crisscross pattern framework connected to inner facing surfaces of the first and second arms; a first coupling member attached to the first end of the first upper linear arm and adapted for secure attachment to the stanchion; and a second coupling member attached to the fourth end of the second lower arm and adapted for secure attachment to the stanchion for stabilizing the attachment of said non-metallic, high strength arrangement to the stanchion.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 2b is a lateral plan view of the stanchion shown in FIG. 2a;

FIG. 3 is a lateral plan view of the cable support bracket used in the cable support arrangement of FIG. 1;

FIG. 4a is a left end view of the cable support bracket as viewed in FIG. 3;

FIG. 4b is a sectional view of the cable support bracket shown in FIG. 3 taken along sight line A-A' therein;

FIG. 5 is a sectional view of the cable support bracket shown in FIG. 3 taken along sight line B-B' therein;

FIG. 6 is a lateral plan view of another embodiment of a cable support bracket in accordance with the present invention;

FIG. 7 is a left end view of the second cable support bracket as view in FIG. 6;

FIG. 8 is a sectional view of the cable support bracket shown in FIG. 6 taken along sight line C-C' therein; and FIG. 9 is a sectional view of the cable support bracket shown in FIG. 6 taken along sight line D-D' therein.

DETAILED DESCRIPTION OF THE PREFERRED EMBODIMENTS

Figure 1:
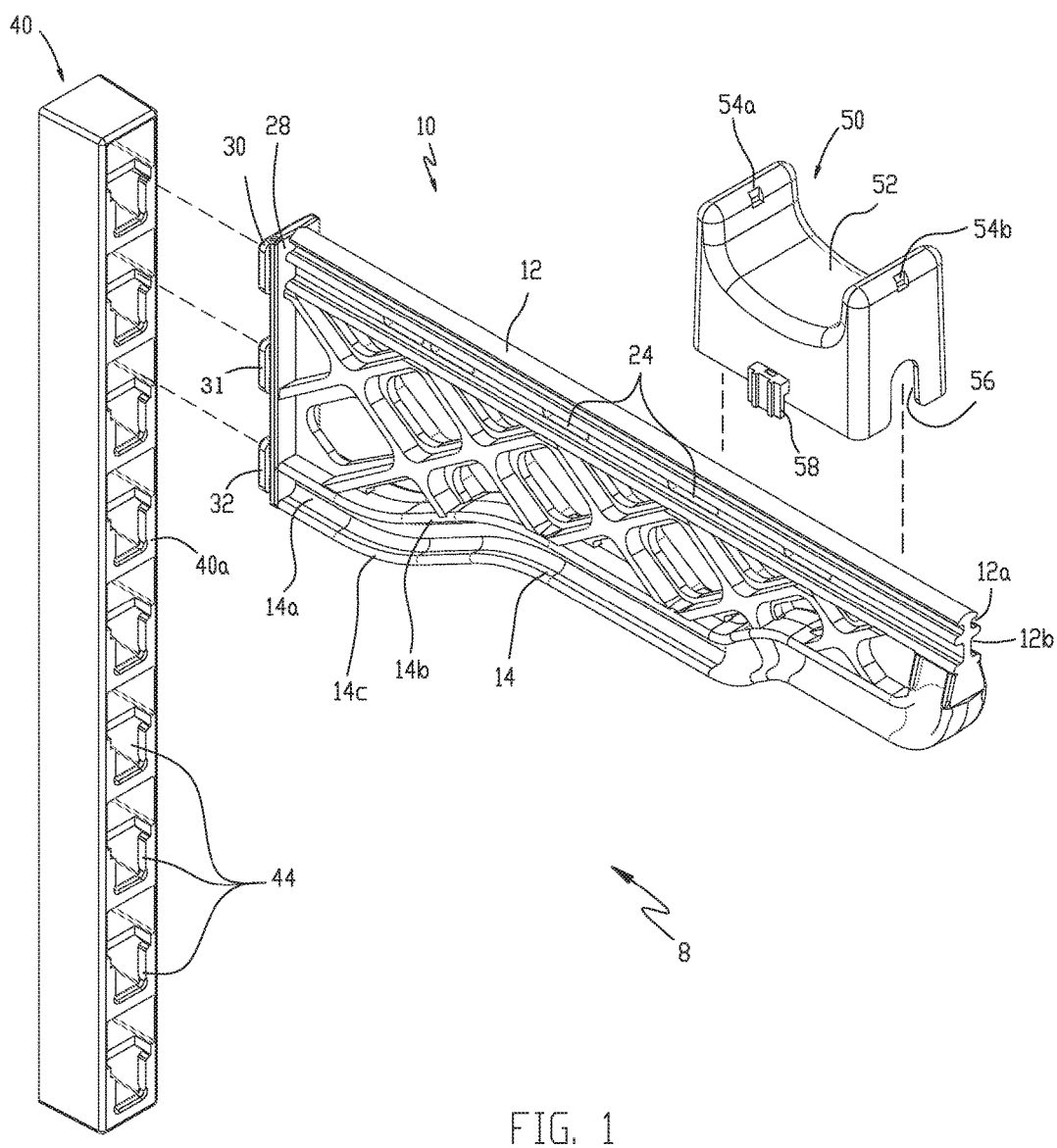
FIG. 1 is an exploded perspective view of an electrical utility cable support arrangement in accordance with one embodiment of the present invention.
Figure 2A:
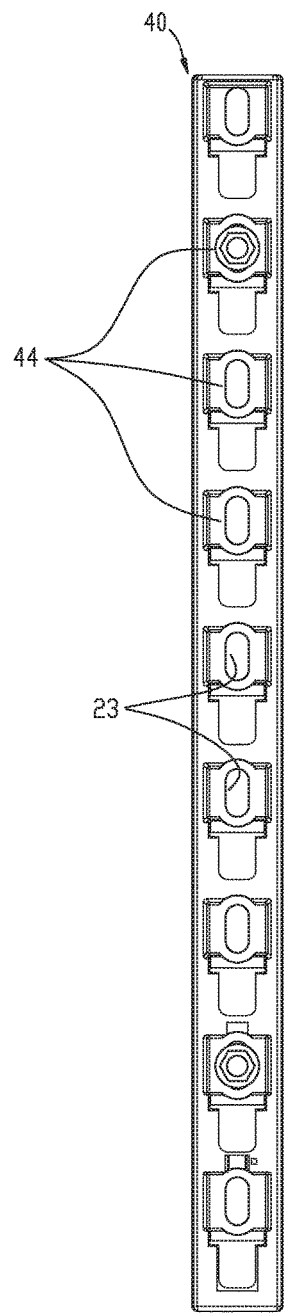
FIG. 2a is a front planar view of the stanchion, or wall channel, for use in the cable support arrangement shown in FIG. 1.
Figure 2B:
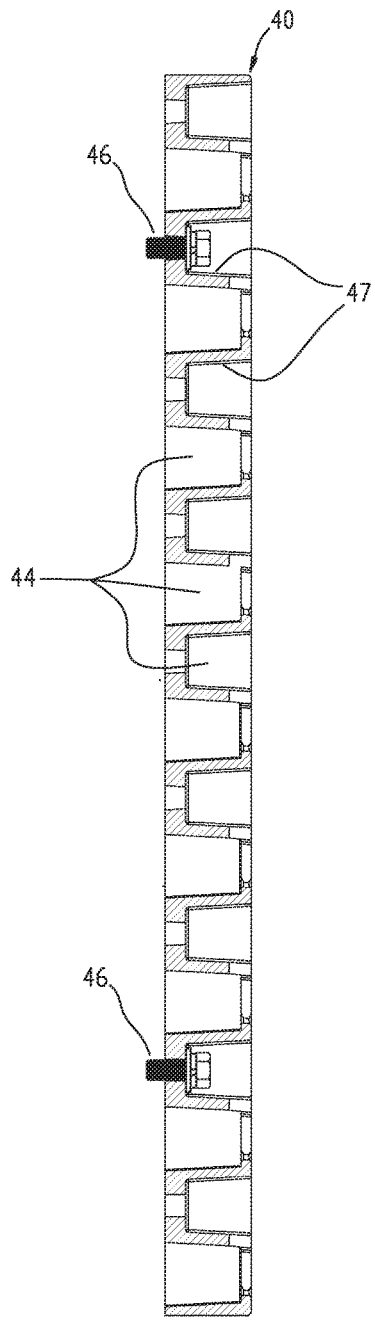

Referring to FIG. 1, there are shown an exploded perspective view of an electrical cable support arrangement 8 in accordance with the present invention. The cable support arrangement 8 includes a support bracket 10, a wall channel, or stanchion, 40, and a cable saddle 50. FIGS. 2a and 2b are respectively front planar and lateral plan views of stanchion 40. FIG. 3 is a lateral plan view of the inventive electrical cable support bracket 10, while FIG. 4a is a left end view of the cable support bracket as viewed in FIG. 3. FIGS. 4b and 5 are sectional views of the inventive cable support bracket 10 respectively taken along sight lines A-A' and B-B' in FIG. 3.

The support bracket 10 includes an upper linear arm 12 joined to a lower stepped arm 14 at a forward end portion of the cable support bracket. Cable support bracket 10 is preferably comprised of 40% fiber reinforced nylon material having a tensile strength of 36,000 pounds and preferably formed as a unitary structure such as by injection molding. The cable support bracket's lower stepped arm 14 is shown in the figures as having two radiused steps extending along its length. The support bracket's upper linear arm 12 and its lower stepped arm 14 have a cross section in the form of at least one I-beam, where the upper linear arm is shown in FIG. 3 as including first upper and a second lower I-beams 12a and 12b, and the lower stepped arm includes an I-beam 14a. I-beam 14 is formed by upper and lower spaced lips 14b and 14c. Disposed between and coupled to the cable support bracket's upper linear arm 12 and its lower stepped arm 14 is a framework, or latticework, formed of crisscrossed, intersecting trusses, or linear beams, 20, which are formed integrally with and securely connect the upper linear arm and the lower stepped arm. The crisscrossed trusses 20 form plural apertures 22 within the latticework, where each aperture is defined by four connected trusses, or by two trusses and an adjacent inner portion of either upper arm 12 or lower arm 14. The trusses 20 cross at 35° relative to a horizontal plane and form semi-circular arches at their intersections to provide increased strength as well as optimum moments of inertia, section modulus and radius of gyration values for the injection molded support structure. The crisscrossed arrangement of the trusses 20 combined with curvilinear arches 26 provide the support bracket 10 with the strength to support 740 pounds.

The upper portion of linear arm 12 is in the form of the aforementioned pair of I-beams 12a and 12b shown in the sectional view of FIG. 5 and extending the length of the upper linear arm. The upper linear arm 12 is adapted to receive and support one or more electrical cable saddles 50 extending in a spaced manner along the length of the electrical cable support bracket 10. The double I-beam configuration of the cable support bracket's upper arm 12 also substantially increases the strength of the support bracket and renders it capable of accommodating, or supporting, a heavy weight of electrical cables. Disposed along a portion of the length of the upper arm's lower I-beam 12b are plural spaced apertures 24, each having a generally elliptical shape. The presence of these spaced apertures 24 reduces the weight of the electrical cable support bracket 10 and more uniformly distributes electrical cable weight along the entire length of the support bracket. In addition, the elongated, elliptical apertures 24 allow for secure positioning of plural cable saddles along the length of the upper portion of the upper arm 12 in a fixed manner. The symmetrical arrangement of the semicircular arches 26 disposed about each of the inner apertures 22 in a spaced manner resists the buckling forces arising from electrical cable weight. The upper surface of the support bracket's upper linear arm 12 is convex along its entire length to provide an increased electrical cable support area without increasing the width of the cable support bracket 10. The upper surface of the cable support bracket 10 is adapted to engage and provide support for plural electrical power distribution cables, but one or more cable saddles 50 as shown in FIG. 1 may be positioned on the support bracket for receiving plural cables and maintaining the cables in substantially fixed position on the support bracket. This shape also facilitates movement of the electrical cables on a cable saddle 50 caused by the electrical load within the cables. The lower stepped arm 14 of the cable support bracket 10 is also in the form of an I-beam having upper and lower portions 14a and 14b of increased width as also shown in the sectional view of FIG. 5. This further increases the strength of the cable support bracket 10. The stepped shape of the support bracket's lower arm 14 also allows for increased space between adjacent, vertically spaced cable support brackets 10 to accommodate an increased number of supported electrical cables on a stanchion 40 shown in FIGS. 1, 2a and 2b. Stanchion 40 is adapted for mounting to a support structure in a conventional manner such as by threaded couplers 46 in a generally vertical orientation. Disposed on the forward, or outer, surface of the stanchion 40 are plural spaced pockets 44 each adapted to receive a support bracket's mounting hook for maintaining the support bracket in fixed position.

Cable saddle 50 is also preferably integrally molded of ABS material (acrylonitrile butadiene styrene) and includes a recessed upper portion 52 such as in the form of a curvilinear groove to engage and support plural electrical cables while allowing for movement of the cables along their respective lengths during operation. A cable saddle particularly adapted for use with the subject invention is disclosed in Applicant's patent application Ser. No. 14/068,886. Cable saddle further includes a pair of upper apertures 54a and 54b adapted for receiving a flexible strap-like member spanning the saddle's upper recessed portion 52 and disposed above and engaging the electrical cables to maintain the cables in position on saddle 50. Cable saddle further includes a pair of aligned lower slots 56, where only one is shown in FIG. 1. Each of these lower slots 56 is adapted to receive the support bracket's upper arm 12 to provide support for the cable saddle 50 and maintain it in position on the cable support bracket 10. Cable saddle 50 further include another pair of lower aligned slots, not shown in FIG. 1 for simplicity, which are adapted to receive in a sliding manner a saddle retainer 58. Saddle retainer 58 is adapted for positioning within one of the apertures 24 within the support bracket's upper arm 12 for securely maintaining the cable saddle in fixed position on the cable support bracket 10.

Formed integrally with and attached to respective inner end portions of the upper linear arm 12 and the lower stepped arm 14 is an end panel 28 to which are attached three mounting hooks 30, 31 and 32. These mounting hooks each include upper and lower lateral extensions 30a and 30b as shown in FIG. 4b for the upper mounting hook 30 and provide the mounting hook with an I-beam shape along its length. Lower mounting member 32 extends outwardly from the aft end of the lower stepped arm 14. Each of the three mounting members 30, 31 and 32 is adapted for insertion in a respective aperture, or pocket, 44 of mounting stanchion 40 for securely attaching the electrical cable support bracket 10 to a support structure such as a wall or pillar as described in detail below.

As shown in FIG. 5, the inventive electrical cable support bracket 10 is tapered in proceeding from a lower portion of the support bracket to its upper portion. This maintains the high strength of the electrical cable support bracket 10 while reducing its size and weight. In addition, the cable support bracket is tapered from wide to narrow in proceeding from its inner end portion shown at the left end of the support bracket 10 in FIG. 3 to narrow at the outer end portion of the support bracket on the right as shown in FIG. 3 to accommodate the increased torque on the bracket's proximal end.

The support wall stanchion 40 is generally U-shaped along its longitudinal axis, as it includes first and second side walls, as well as a front wall coupled between, and formed integrally with, the two side walls. In a preferred embodiment, stanchion 40 is also preferably comprised of non-conductive, high strength, 40% fiber re-enforced nylon and is formed by a conventional injection molding process so that its walls are integrally formed with one another to provide a high-strength unitary structure. Spaced along the length of the wall stanchion 40 and disposed in its aft wall are plural spaced generally oval apertures 23 for securely attaching the wall stanchion to an aforementioned support structure such as a brick or concrete wall by conventional means such as screws 46 or nut and bolt combinations. An electrical cable support bracket's mounting hook is inserted into a stanchion pocket 44 and is moved downward for securely locking support bracket 10 to the wall stanchion 40 and maintaining the cable support bracket in fixed alignment with the wall stanchion.

Referring to FIG. 6, there is shown another embodiment of a cable support bracket 61 in accordance with the present invention. FIG. 7 is a left end view of the cable support bracket 61 as shown in FIG. 6. FIGS. 8 and 9 are sectional views of the cable support bracket 61 shown in FIG. 6 taken respectively along sight lines E-E' and D-D'. Some of the components in the second embodiment of the inventive cable support bracket 61 shown in FIGS. 6-9 are the same as the corresponding components in the cable support bracket 10 shown in FIGS. 3-5 and have been given corresponding element identifying numbers. For example, the cable saddle retainer slots 60 in the embodiment shown in FIG. 6 are the same as, and perform the same function as, the corresponding retainer slots 24 shown in FIG. 3.

The primary difference between the first cable support bracket 10 shown in FIG. 3 and the second embodiment of the cable support bracket 61 shown in FIG. 6 is that the latter is smaller in size then and provides less support for the electrical cables disposed thereon. For example, the shorter cable support bracket 61 shown in FIG. 6 has a length in the range of 8 inches to 15 inches, while the first embodiment of the cable support bracket 10 shown in FIG. 3 has a length in the range of 16 inches to 30 inches. As a result, the larger cable support bracket 10 requires three molded mounting hooks 30, 31 and 32, while the second, smaller cable support bracket 61 is provided with only two mounting hooks 62a and 62b. Both cable support brackets are preferably comprised of 40% fiber reinforced nylon material, where the second cable support bracket 61 provides a tensile strength of 16,000 as compared to the 36,000 pounds of tensile strength provided by the first, larger cable support bracket 10. The spacing between the mounting hook on each of the two embodiments of the inventive cable support bracket are the same, permitting both cable support brackets to be used with the same stanchions having the same inter-mounting aperture spacing. The shorter cable support bracket 61 shown in FIG. 6 is particularly adapted for use in the confined spaces of smaller manholes frequently encountered.

While particular embodiments of the present invention have been described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper prospective based on the prior art.

The invention claimed is:

1. A unitary non-metallic, high strength cantilevered arrangement for supporting one or more electrical power cables comprising:
   a first upper, generally horizontal linear arm for receiving one or more electrical cables, said upper arm having first and second opposed ends and at least one I-beam section extending the length thereof and a convex top surface adapted for engaging the one or more electrical cables and providing an increased cable support area;
   a second lower arm having third and fourth opposed ends, wherein the second end of said first arm is formed integrally with the third end of said second arm and said second arm is inclined downwardly from its third end to its fourth end and is non-linear including plural stepped portions disposed along its length to provide increased space beneath said second arm, wherein said first upper and second lower arms each include at least one I-beam section extending the length of the arm for increased strength;
   plural interconnected trusses forming an apertured crisscross pattern framework connected to inner facing surfaces of said first and second arms;
   a first coupling member attached to the first end of said first upper linear arm and adapted for secure attachment to a stanchion; and
   a second coupling member attached to the fourth end of said second lower arm and adapted for secure attachment to said stanchion for stabilizing the attachment of said non-metallic, high strength arrangement to said stanchion.

2. The high strength cantilevered arrangement of claim 1, wherein said arrangement is comprised of a unitary plastic structure formed by injection molding.

3. The high strength cantilevered arrangement of claim 2, wherein said unitary plastic structure is comprised of fiber reinforced polypropylene.

4. The high strength cantilevered arrangement of claim 1, wherein said upper arm is in the form of plural I-beams stacked one on another along their respective lengths.

5. The high strength cantilevered arrangement of claim 4, wherein said first upper linear arm is adapted to receive and maintain in fixed, spaced position one or more cable saddles supporting said electrical power cables in generally fixed, stationary positions along the length of said first upper linear arm.

6. The high strength cantilevered arrangement of claim 1, wherein said second lower arm has a cross-section in the form of an I-beam and includes three stepped portions increasing in downward space from said first upper linear arm in proceeding from its second end to its first end and toward said support member.

7. The high strength cantilevered arrangement of claim 1, wherein said trusses are formed integrally with one another and are interconnected in a crisscrossed manner so as to form four-sided apertures with one another, and three-sided apertures with each of said first upper and second lower arms.

8. The high strength cantilevered arrangement of claim 7, wherein each of said apertures includes at least one generally semi-circular inner arch coupling adjacent trusses.

9. The high strength cantilevered arrangement of claim 1, wherein said coupling members allow for movement of said high strength cantilevered arrangement relative to said stanchion arising from expansion and contraction of the electrical cables during operation.

10. The high strength cantilevered arrangement of claim 1, wherein each of said coupling members is linearly elongated and includes an I-beam shaped portion extending along the length of the coupling member for increased strength.

* * * * *